United States Patent
Bordin (10) Patent No.: US 10,900,240 B2
(45) Date of Patent: Jan. 26, 2021

(54) SUPPORT FOR RAISED FLOORS

(71) Applicant: PROGRESS PROFILES SPA, Asolo (IT)

(72) Inventor: Dennis Bordin, Asolo (IT)

(73) Assignee: PROGRESS PROFILES SPA, Asolo (IT)

( * ) Notice: Subject to any disclaimer, the term of this patent is extended or adjusted under 35 U.S.C. 154(b) by 0 days.

(21) Appl. No.: 16/410,143

(22) Filed: May 13, 2019

(65) Prior Publication Data

US 2019/0368203 A1    Dec. 5, 2019

(30) Foreign Application Priority Data

Jun. 5, 2018 (IT) .................... 102018000006024

(51) Int. Cl.
*E04F 15/024* (2006.01)

(52) U.S. Cl.
CPC .. *E04F 15/02482* (2013.01); *E04F 15/02476* (2013.01)

(58) Field of Classification Search
CPC .......... E04F 15/02482; E04F 15/02476; E04F 15/02452; E04F 15/0247
See application file for complete search history.

(56) References Cited

U.S. PATENT DOCUMENTS

| | | | | |
|---|---|---|---|---|
| 3,318,057 A | * | 5/1967 | Norsworthy | E04F 15/02452 52/126.6 |
| 6,332,292 B1 | * | 12/2001 | Buzon | E04D 11/007 248/351 |
| 6,363,685 B1 | * | 4/2002 | Kugler | E04F 15/02183 52/126.6 |
| 7,866,096 B2 | * | 1/2011 | Lee | E04F 15/02476 248/351 |
| 8,122,612 B2 | * | 2/2012 | Knight, III | E04D 11/007 33/199 R |
| 8,490,342 B2 | * | 7/2013 | Greaves | E04D 12/006 52/126.5 |
| 8,850,753 B2 | * | 10/2014 | Tabibnia | E04F 15/02464 248/188.2 |

(Continued)

FOREIGN PATENT DOCUMENTS

| | | |
|---|---|---|
| CN | 206917190 U | 1/2018 |
| DE | 3709017 A1 | 10/1988 |

(Continued)

OTHER PUBLICATIONS

IT Search Report dated Jan. 29, 2019 re: Application No. IT 2018000006024, pp. 1-10, citing: CN 206 917 190 U, DE 37 09 017 A1 and WO 99/23327 A1.

*Primary Examiner* — Joshua K Ihezie
(74) *Attorney, Agent, or Firm* — Cantor Colburn LLP (57) ABSTRACT

A support for raised floors including a base for resting on a lower surface, an element for connecting and adjusting the local height of a raised floor, and a resting head for one or more tiles of the raised floor. The connecting and adjustment element has a first portion for providing floors that are inclined with respect to the lower surface. The connecting and adjustment element further includes a second portion, which lies opposite the first portion, for providing floors that are parallel to the lower surface. The first portion and the second portion interacting alternately with the head by rotating the element through 180°.

34 Claims, 9 Drawing Sheets

(56) References Cited

U.S. PATENT DOCUMENTS

| | | | |
|---|---|---|---|
| 8,898,999 B1* | 12/2014 | Kugler | E04F 15/02464 52/126.6 |
| 9,410,296 B2* | 8/2016 | Tabibnia | E01C 5/00 |
| 9,879,385 B2* | 1/2018 | Tabibnia | F24D 3/127 |
| 2003/0070372 A1* | 4/2003 | Favero | E04F 15/02482 52/220.1 |
| 2004/0261329 A1* | 12/2004 | Kugler | E04F 15/02183 52/126.6 |
| 2008/0222973 A1* | 9/2008 | Lee | E04F 15/02488 52/126.1 |
| 2009/0183442 A1* | 7/2009 | Repasky | E04F 15/0247 52/126.6 |
| 2010/0050457 A1* | 3/2010 | Knight, III | E04F 15/0247 33/836 |
| 2010/0051763 A1* | 3/2010 | Knight, III | E04D 11/007 248/161 |
| 2016/0040439 A1* | 2/2016 | Pelc | E04F 15/0247 52/126.6 |
| 2017/0152635 A1* | 6/2017 | Tabibnia | E04F 15/02447 |
| 2017/0152665 A1* | 6/2017 | Pelc, Jr. | E04F 15/02482 |

FOREIGN PATENT DOCUMENTS

| | | |
|---|---|---|
| EP | 1304426 A2 | 4/2003 |
| GB | 985148 A | 3/1965 |
| RU | 2639338 C1 | 12/2017 |
| WO | 9923327 A1 | 5/1999 |

* cited by examiner

SUPPORT FOR RAISED FLOORS

CROSS-REFERENCE TO RELATED APPLICATIONS

This application is related to and claims the benefit of Italian Patent Application No. 102018000006024, filed on Jun. 5, 2018, the contents of which are herein incorporated by reference in its entirety.

TECHNICAL FIELD

The present disclosure relates to a support for raised floors.

The disclosure is applied in the building sector, for the provision of raised floors.

BACKGROUND

Raised floors are currently widespread and are applied when, for example, the wiring of the electrical systems, the water pipes and/or the heating and cooling piping have to be installed between a floor and a lower surface.

In other cases, raised floors are used when there is the need for a direct resting of floor coverings without gluing.

Usually, raised floors rest on supports, arranged between the floor and the underlying surface.

The supports are evenly spread on the lower surface in order to cooperate in the support of the panels or tiles of the floor. These supports have a base, which rests on the underlying surface, a head on which portions of one or more tiles of the floor rest, generally the adjacent corners of four tiles, and a tubular connection and separation element between the head and the base.

The underlying surface may be a floor with a horizontal extension, a floor with a slope, or any other surface, suitable for laying a raised floor covering on which one wishes to place a raised floor.

In applications on horizontal lower surfaces, the supports are usually adjustable in height.

Underlying surfaces, however, are often not horizontal. The surfaces of a floor, for example, can be inclined in order to drain rainfall and melt snow and ice.

In applications of this type, in order to obtain the installation of a flat horizontal floor on an inclined underlying surface, the supports are not only adjustable in height but also have a head the inclination of which is adjustable with respect to the rest of the support.

These known techniques have drawbacks.

Usually, the supports provide either a resting head which is "fixed", and therefore stable with respect to the rest of the support, or a "self-leveling" resting head, capable of automatically orienting itself, with respect to the rest of the support, in order to obtain a horizontal floor starting from an inclined underlying surface.

The models of supports with a "fixed" head provide a floor covering that has the same inclination as the underlying surface and is thus parallel thereto.

With these models, when it is necessary to provide a horizontal floor covering starting from an inclined lower surface, or a floor covering with an inclination that is different with respect to that of the underlying surface, it is unavoidable to use suitable accessories for compensating the inclination, which are to be arranged under the base, such as for example wedges or disks. This entails the need for additional accessories.

Support models with a "self-leveling" head instead usually have a dome, with the concavity directed upward, which rests on an element that is integral with the rest of the support, in order to level the floor and make it horizontal starting from an inclined underlying surface.

In order to be able to meet one requirement or the other, depending on the specific case, it is thus necessary for an installer to have in store both support models. This entails the need for a significant storage volume for stocking.

Furthermore, situations can occur in which the use of both support models is required within a same building site, with the consequent drawback of having to use a considerable number of different supports.

Moreover, currently commercially available models use resting bases of different dimensions and characteristics according to the heights of the floor coverings. Usually, small and low bases are used for reduced heights and higher and more structured resting bases are used instead for higher floors.

Many of the commercially available models, moreover, use additional parts, such as couplings and threaded extensions screwed to each other, in order to reach the required heights. These additional parts also have different characteristics and dimensions.

This entails the drawback, for an installer, of having in stock resting bases of a different type and a considerable number of additional parts in order to meet each requirement, with the need, described above, for a significant volume of storage for stocking.

Some models, furthermore, use tubes made of PVC (polyvinyl chloride) with very precise characteristics that are not simple to find on the market.

The installer is thus forced to procure directly from a small number of specific manufacturers.

Finally, the various components of the support are mostly hollow inside, even up to 80%, and this causes high shipping costs in relation to the weight and the number of parts.

SUMMARY

The aim of the present disclosure is to provide a support for raised floors that is capable of improving the background art in one or more of the aspects mentioned above.

Within this aim, the disclosure provides a support for raised floors that allows, with a single head, to install inclined or horizontal floors according to the requirements.

The disclosure also provides a support for raised floors that allows to reduce the storage volume necessary for its stocking.

The disclosure further provides a support for raised floors that allows to reduce shipping costs in relation to the weight and number of parts.

The disclosure provides a support for raised floors that does not require the use of additional accessories in order to compensate the inclination or to reach specific heights.

The disclosure further provides a support for raised floors that allows the use of a tubular element that is easily commercially available on the local market of the customer.

The present disclosure overcomes the drawbacks of the background art in a manner that is alternative to any existing solutions.

The disclosure provides a support for raised floors that is highly reliable, relatively easy to provide and at competitive costs.

This aim and these and other advantages which will become better apparent hereinafter are achieved by providing a support for raised floors, comprising in the following order: a base for resting on a lower surface, an element for connecting and adjusting the local height of a raised floor, and a resting head for one or more tiles of said raised floor, characterized in that said connecting and adjustment element has a first portion, for providing floors that are inclined with respect to said lower surface, and a second portion, which lies opposite said first portion, for providing floors that are parallel to said lower surface, said first portion and said second portion interacting alternately with said head by rotating said element through 180°.

BRIEF DESCRIPTION OF THE DRAWINGS

Further characteristics and advantages of the disclosure will become better apparent from the description of a preferred but not exclusive embodiment, of the support for raised floors according to the disclosure, illustrated by way of non-limiting example in the accompanying drawings, wherein.

DETAILED DESCRIPTION OF THE DRAWINGS

With reference to the cited figures, a support for raised floors according to the disclosure is generally designated by the reference numeral 10.

Said support 10 is self-supporting and is configured to support one or more tiles 11 of a raised floor.

The support 10 shown in the figures, for example, is configured to support the adjacent corners of four different tiles 11 of the raised floor, each resting one of their corners on said support.

Figure 2A:
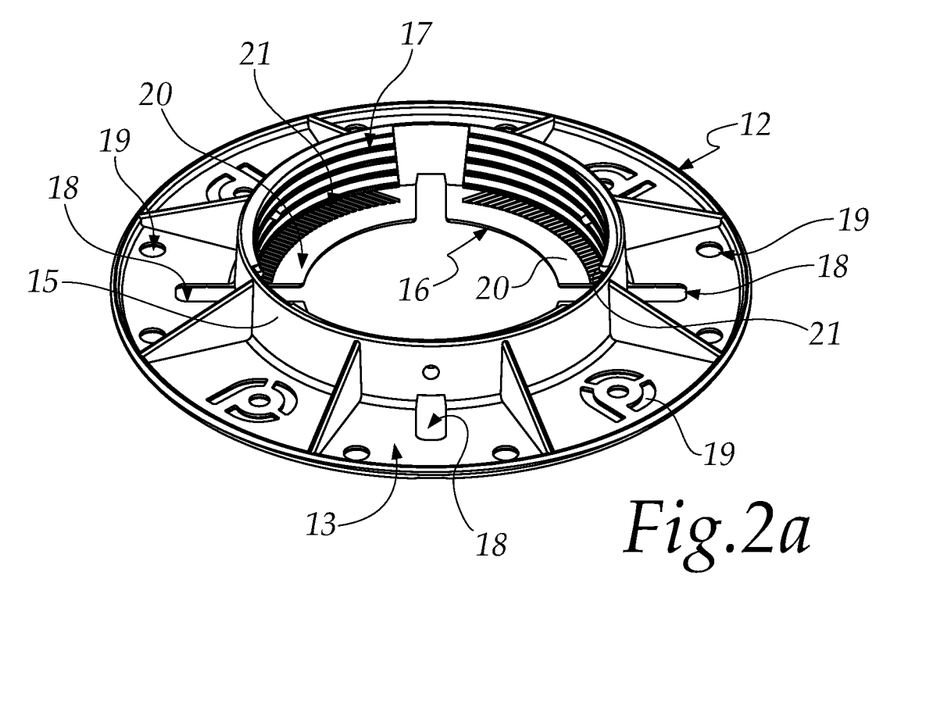
FIGS. 2a and 2b are two views, a perspective view and a bottom view, of the resting base of the support of FIG. 1.
Figure 2B:
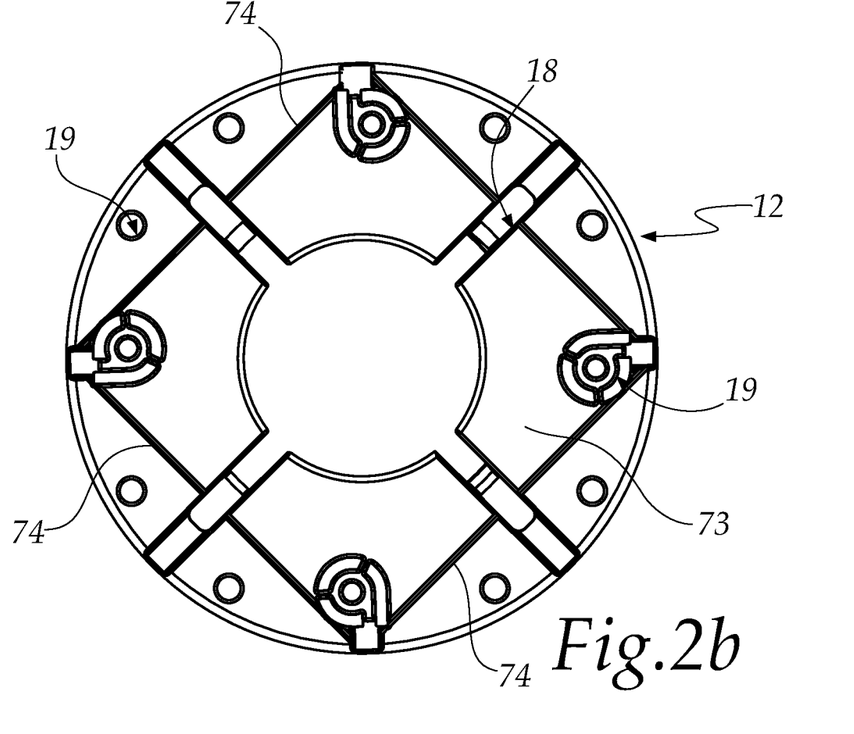

The support 10 comprises a resting base 12, which has a wider portion 13, having a circular cross-section, that interacts with the lower surface 14. The wider portion 13 has a central through hole 16 having a substantially circular cross-section.

In constructive variations, not shown in the figures, the resting base and the cross-section of the central through hole may have different regular or irregular shapes.

The base 12 is preferably made of plastic material or other material suitable for thermoforming and/or adapted to provide supporting bases for raised floor coverings, and has a central annular portion 15 which is axially symmetrical and is extended at right angles to the wider portion 13. In particular, the axis of extension of the annular portion 15 passes through the center of the circle defined by the external perimeter of the wider portion 13.

The annular portion 15 is extended into the portion of the base 12 that is opposite with respect to the one in contact with the lower surface 14.

The wider portion 13, the annular portion 15 and the cross-section of the through hole 16, on the plane that is parallel to the wider portion 13, are concentric.

In constructive variations, not shown in the figures, these can be offset to provide bases with particular perimetric applications and shapes.

The through hole 16 has a diameter that is smaller than the diameter of the cross-section of the annular portion 15.

The annular portion 15 has, on the internal lateral surface, an internal thread 17, adapted to correspond to an external complementary thread that is present on a connecting element 22 and/or an extender tube, selectively.

The wider portion 13 has a plurality of openings 18 in order to allow the passage and discharge of water.

These openings 18 are arranged proximate to the annular portion 15, extend in a radial direction with respect to the axis of extension of the annular portion 15, and have such a length as to be partly outside and partly inside the circular cross-section of said annular portion 15, connecting with the through hole 16.

Between the annular portion 15 and the external perimetric edge of the wider portion 13 there is a plurality of through holes 19 for draining water and/or fixing a lower layer of non-slip rubber and/or ground anchoring.

The wider portion 13 has a plurality of regions 20 inside the volume defined by the annular portion 15. Each region 20 is comprised between two successive openings 18.

The regions 20 have, proximate to the inner perimetric edge of the annular portion 15, a knurled surface 21 adapted to generate friction in order to contrast the rotation of an extender tube 51, described hereinafter.

In constructive variations, not shown in the figures, said surface 21 can also be smooth or provided with a satin finish adapted to increase friction.

FIG. 2b shows the surface 73 of the base 12 in contact with the lower surface, in the configuration for use.

The surface 73 can be smooth; as an alternative it can be satin finished and/or sanded in order to create greater friction by contact and improve non-slip capacity.

The lower surface 73 has a plurality of incisions 74 and/or shearing and/or cutting notches, adapted to provide supports 10 for perimetric and/or corner arrangement of the tiles 11 of the raised floor.

Figure 1:
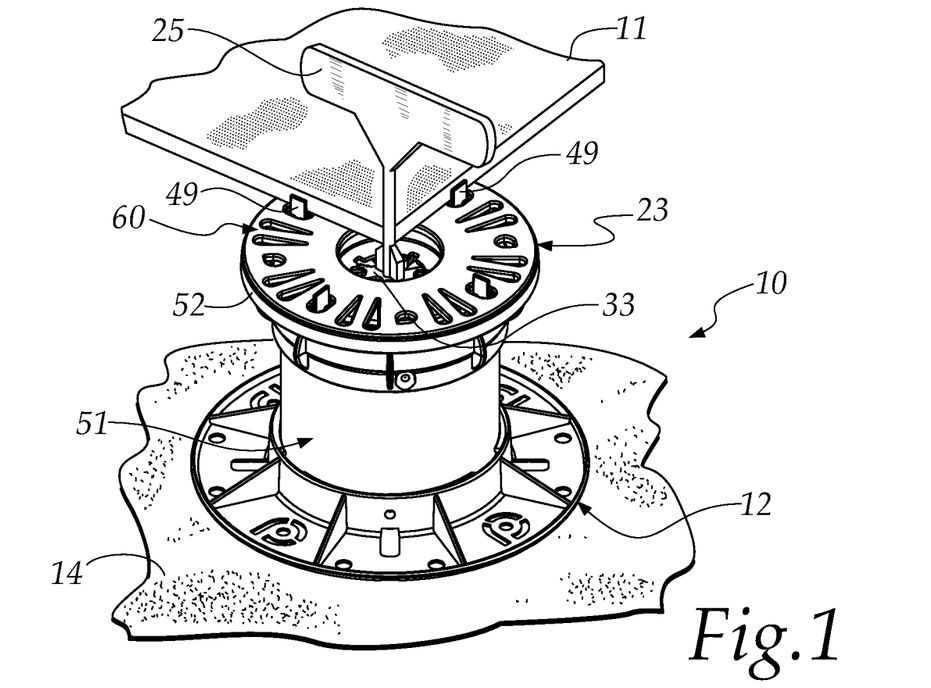
FIG. 1 is a view of a support for raised floors according to the disclosure in a configuration for application.

The support 10 comprises an element 22 for connecting between the base 12 and the resting head 23 and for adjusting the height of the support 10.

Figure 3A:
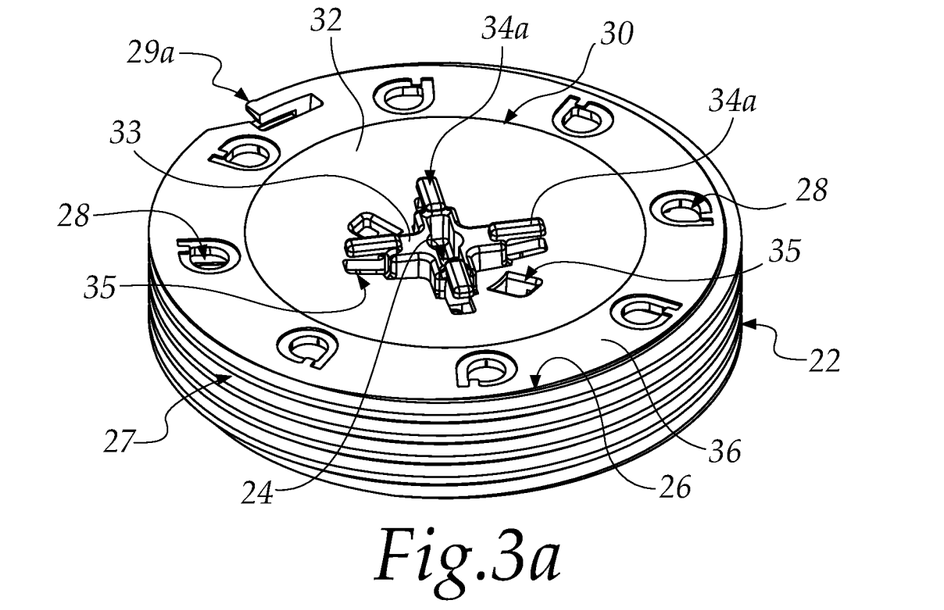
FIGS. 3a and 3b are two different perspective views of the adjustment element of the support of FIG. 1.
Figure 3B:
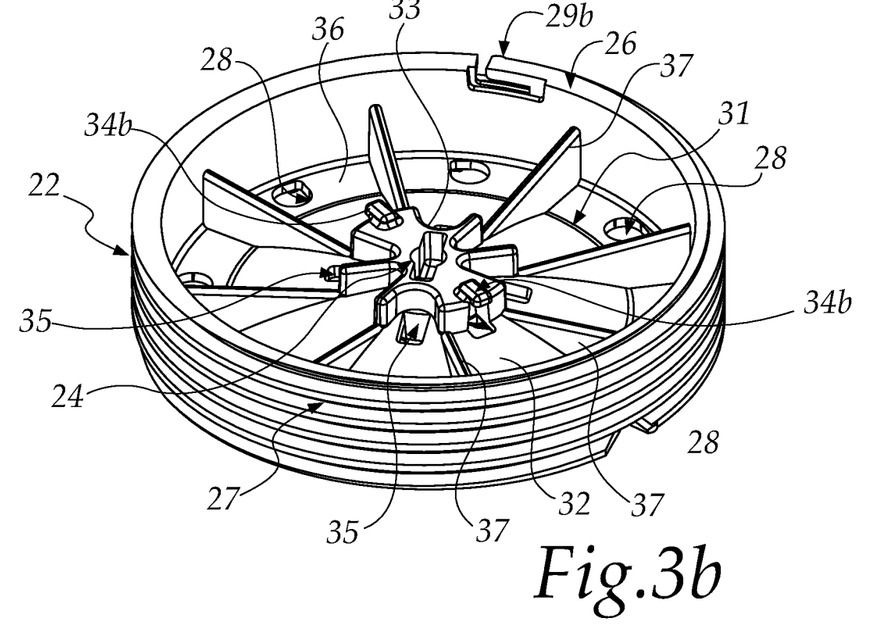

The element 22 is preferably made of plastic material, or other material suitable for thermoforming and/or adapted to provide connecting elements for supports for raised floor coverings, and can have a height that is variable, according to the requirements, for example between 1 and 1000 mm.

The element 22 has a central through hole 24 with an axis of extension that substantially coincides with the axis of extension of the support 10.

The hole 24 has a polygonal shape, which can have different regular or irregular geometric shapes, for the insertion, with shape mating, of an adjustment key 25.

By rotating the adjustment key 25, the element 22 is inserted to a greater or smaller extent in the base 12 according to the requirements.

The element 22 has an external perimetric edge 26 with an external thread 27.

The external thread 27 of the element 22 is threaded complementarily with respect to the internal thread 17 of the base 12, so as to generate a coupling between these two elements following the rotation of one with respect to the other.

The external thread 27 has, at its two ends, a portion 29a and 29b that is shaped in order to generate a snap action and/or a hindrance to a further rotation of the element 22, indicating to the user that maximum and minimum protrusion have been reached.

Figure 5:
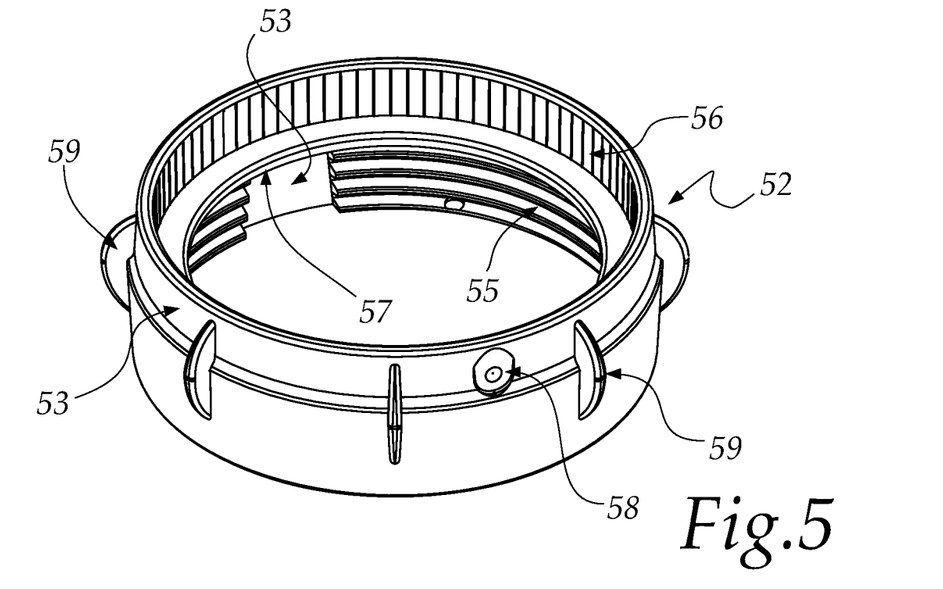
FIG. 5 is a perspective view of the connecting ring of the support of FIG. 1.

The snap action is obtained by virtue of the presence, in the internal thread 17 of the base 12 and in the internal thread 55 of the ring 52 described hereinafter, of a recess and/or indentation and/or hole in which the shaped portion 29a or 29b is blocked with interference.

Proximate to the external perimetric edge 26, the element 22 has a plurality of through holes 28 for discharging water, with an axis that is parallel to the axis of the central hole 24.

The holes 28 are arranged on a disk-like surface 36 that is perpendicular to the perimetric edge 26.

Such holes 28 have a raised edge, on the surface 36, in order to allow better ergonomics in the unscrewing and screwing of the element 22.

The surface 36 faces and is at least partially in contact with the lower surface of the head 23, in the configuration for laying a floor with an inclination with respect to the lower surface.

One of the particularities of the disclosure resides in that the element 22 has a first portion 30, for providing a floor with an inclination with respect to the lower surface, and a second portion 31, which is opposite with respect to the first portion 30, for providing floors that are parallel to the lower surface.

In particular, for providing a floor with an inclination with respect to the lower surface, the second portion 31 is arranged toward the base 12 and the first portion 30 is directed toward the head 23: in this manner the head 23 can slide/rotate on the concavity so as to obtain flatness of the floor covering.

In order to provide a floor that is parallel to the lower surface, instead, the first portion 30 is arranged toward the base 12 and the second portion 31 is directed toward the head 23, which rests stably without the possibility for inclination.

The element 22 can then be screwed in turn in two different manners to the base 12, using the same external thread 27, by rotating it through 180°.

The first portion 30 of the element 22 has a region 32 with a spherical dome-like shape with the concavity directed upward and the point of maximum concavity at the central hole 24, considering the laying of a floor with an inclination with respect to the lower surface.

The dome-like region 32 extends starting from the internal perimeter of the disk-like surface 36, toward the central hole 24.

Proximate to the central hole 24 there is a body 33 which comprises a plurality of wings 34a for the interlocking of a region of the head 23.

In the example shown in FIG. 3a, the central body 33 is crossed by the hole 24 and has, in the first portion 30 of the element 22, an X-shaped profile, at the ends of each line of which one of the wings 34a extends.

Around the body 33 there is a plurality of through holes 35 for the discharge of water, with an axis of extension that is parallel to the axis of the through hole 24.

The second portion 31 of the element 22, which is opposite with respect to the first portion 30, has a plurality of ribs 37, each extending between the perimetric edge 26 and the central body 33.

Like the first portion 30, also in the second portion 31 a plurality of wings 34b for the interlocking of a region of the head 23 extends from the central body 33.

The ribs 37, starting from the perimetric edge 26, integrate in the dome-like region 32, substantially vanishing proximate to the central body 33.

The ribs 37 face and are in contact with the lower surface of the head 23, in the configuration of the support 10 for providing a floor that is parallel to the lower surface.

Figure 4A:
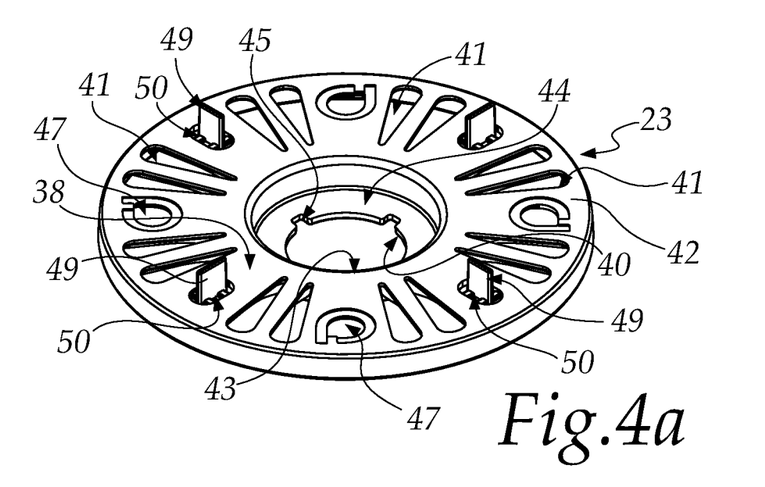
FIGS. 4a to 4c are three different perspective views of the resting head of the support of FIG. 1.
Figure 4B:
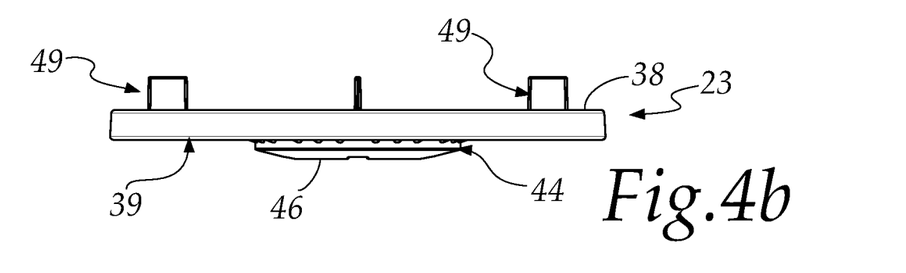
Figure 4C:
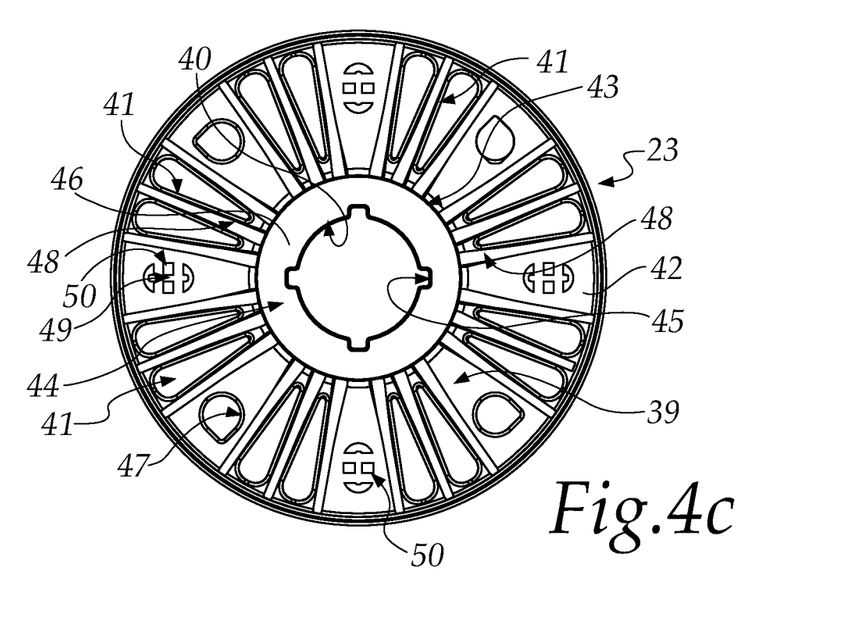

The resting head 23 is preferably made of plastic material, or other material suitable for thermoforming and/or adapted to provide heads for supports for raised floor coverings, and has a first portion 38 adapted to be in contact with the tiles 11 of a floor and a second portion 39, which is opposite the first portion 38, in contact with the element 22.

The head 23 has a substantially disk-like shape, with a through central hole 40 adapted for the insertion of the central body 33 of the element 22 for anchoring the head 23 to the element 22 by means of the wings 34a or 34b.

In constructive variations, not shown in the figures, the head can have a different regular or irregular geometric shape.

The hole 40 has an axis of extension that is parallel to the axis of extension of the support 10.

The head 23 has a plurality of through openings 41 for the discharge of water and/or the anchoring of a sound-absorbing layer 60, described hereinafter.

The head 23 comprises a substantially tray-like body 44, which protrudes from the lower surface of the head 23, located in the second portion 39.

The body 44 incorporates the central hole 40, which is in the base 46 of the tray that constitutes the body 44.

The lateral edge of the tray that constitutes the body 44 has a circular shape and defines an internal edge 43 for the head 23.

The openings 41 have a substantially triangular profile and extend between the external perimetric edge 42 and the internal disk-like edge 43.

In constructive variations, not shown in the figures, said openings can have different regular or irregular geometric shapes.

Figure 7:
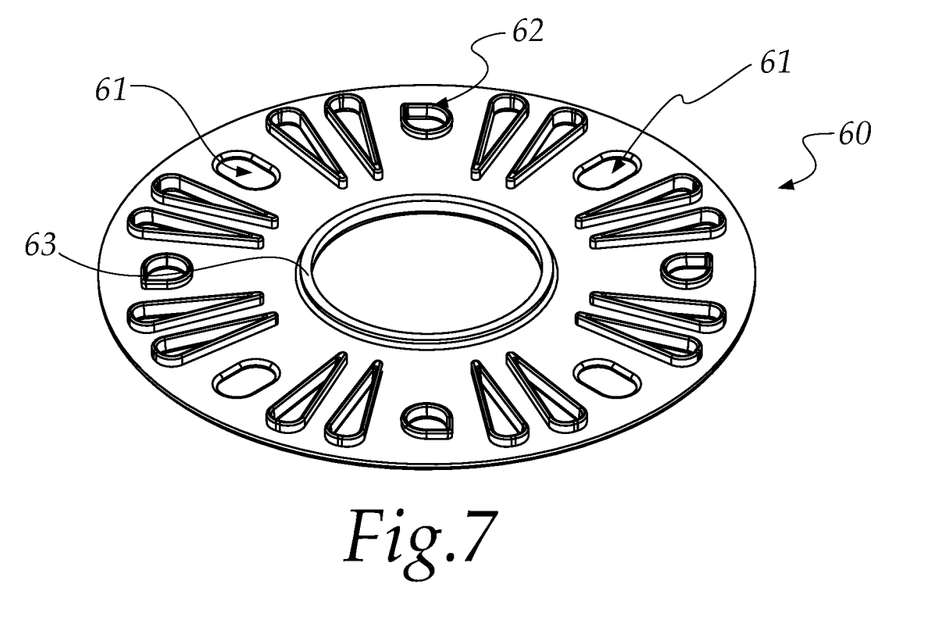
FIG. 7 is a perspective view of the sound-absorbing and non-slip layer of the support of FIG. 1.

The purpose of these openings is to provide a correct outflow of the water and to allow the layer 60, described hereinafter, to be fixed on the top of the head 23, in the configuration for use.

The profile of the central hole 40 is substantially circular but has some localized widenings 45 of the diameter in order to ensure a passage section to the central body 33 of the element 22, with the wings 34a or 34b, for the association between the head 23 and the element 22.

Once the element 22 has been inserted by making the wings 34a or 34b pass through the widenings 45 of the hole 40, interference is generated between the head 23 and the element 22 by rotating slightly the former with respect to the latter, obtaining a bayonet coupling. The head 23 is thus associated with the element 22.

The base 46 of the body 44 has a concavity that is directed upward in the configuration for use.

In order to provide floors with a certain inclination with respect to the lower surface, the concavity of the base 46 is used to adjust the inclination of the surface of the floor, making it conveniently interact with the dome-like region 32 of the first portion 30 of the element 22.

In order to provide floors which are parallel to the lower surface, the disk-like portion and/or the external perimetric edge 42 of the head 23 are superimposed evenly on the perimetric edge 26 of the element 22 and the base 46 rests on the ribs 37 of the element 22. In this manner there is no possibility of inclination between the head 23 and the element 22.

The head 23 has a plurality of through holes 47 for anchoring a sound-absorbing layer 60 and/or grip accessories. These holes 47 are, for example, equidistant.

The second portion 39 of the head 23 has a plurality of reinforcement ribs 48 which extends between the outer perimetric edge 42 and the inner disk-like edge 43.

The first portion 38 of the head 23 has a plurality of removable tabs 49 having substantially the shape of a parallelepiped and adapted to divide the resting surface of the head 23 and to define portions for the resting of a part of the tile 11 of the floor.

The tabs 49 can vary in number from one to one hundred and can also have other regular or irregular shapes, extending from the bottom upward, in the configuration for use. The height of these tabs can be from 1 to 1000 mm, and they can have a total thickness, useful for providing the clearance/distance between the ceramics of the floor covering, from 1 to 1000 mm.

In the example shown in the figures, the tabs 49 are four and define four resting portions, each for one corner of a tile 11 for the raised floor.

Depending on the requirements, one or more tabs 49 can be easily removed, since there is a preweakening region 50 at the base of each tab 49.

Each preweakening region 50 is constituted by bridges of material between the tab 49 and the rest of the head 23, alternated with through openings.

Figure 10:
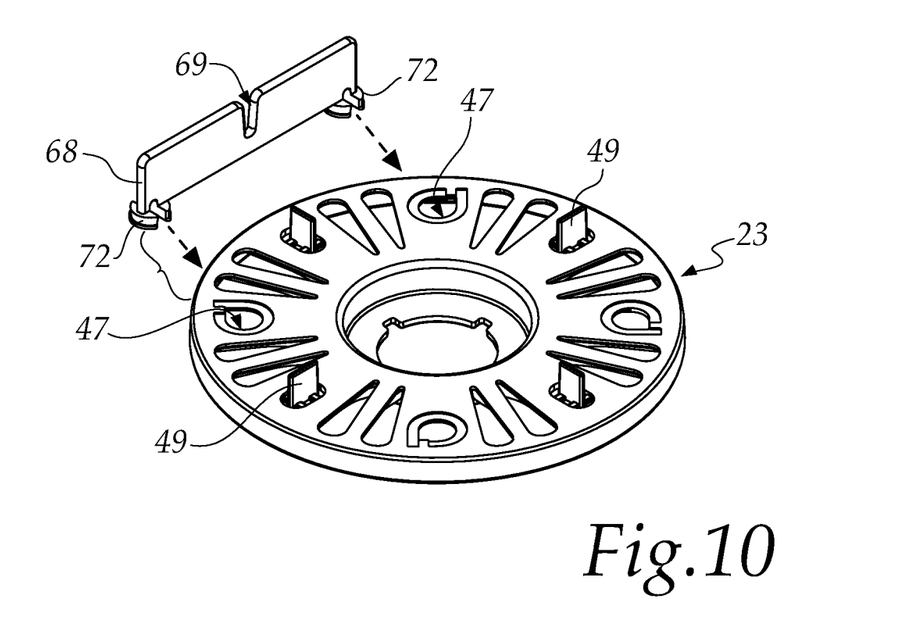
FIG. 10 is a view of a resting head of a support, according to the disclosure, applied in the provision of a raised floor made of wood.
Figure 11:
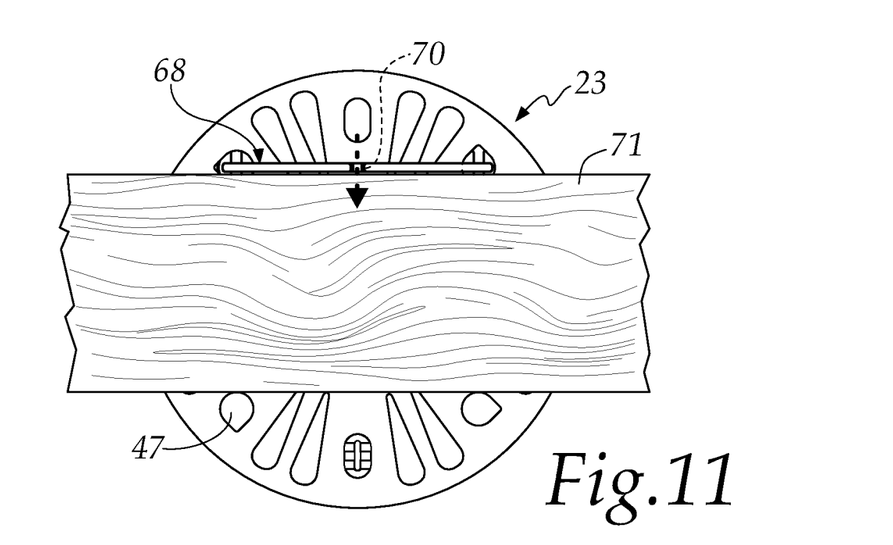
FIG. 11 is a top view of the head of FIG. 10.

With reference to FIGS. 10 and 11, in order to provide raised floors made of wood with floating slats it is possible to use the two following methods.

In the first method, an auxiliary element 68 is fixed on the head 23 and provides on the head 23 a lateral tab at right angles to the plane of the head 23.

In this case at least two of the four tabs 49 are removed so as to allow the resting of a beam 71.

The beams 71 allow to provide a regular structure on which to fix the wood slats to provide a raised floor covering made of wood.

The auxiliary element 68 is provided with two interlocking feet 72 in two corresponding through holes 47.

In the second method, not shown in the figures, the head 23 is provided monolithically with the element 68 and is already in itself suitable for fixing beams 71 or other types of support. In this case the head 23 has a single lateral tab, provided by the element 68, which is at right angles to the plane of the head, suitable for the resting of a beam 71 or of another profile adapted for the subsequent laying of the slats made of wood.

In both of the cases described above, the element 68 for supporting the beam 71 has an opening 69, which can be central or not, adapted for the insertion of an element for fixing the element 68 to the beam 71. The direction of application of the fixing element is indicated by the arrow 70.

The fixing element can be, for example, a nail and/or a screw and/or a pin.

Figure 6:
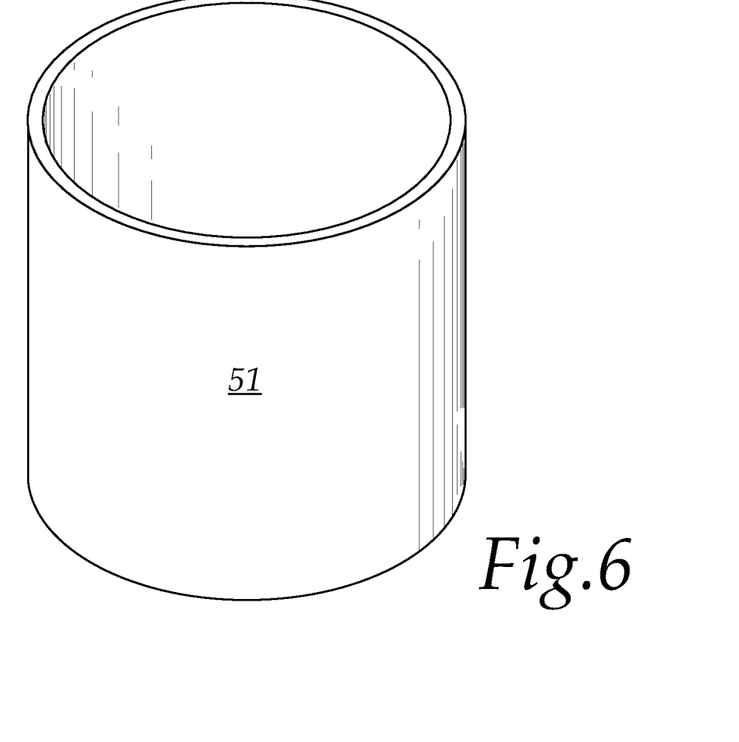
FIG. 6 is a perspective view of the extender tube of the support of FIG. 1.

In order to provide raised floors beyond a certain height, the support 10 can comprise an extender tube 51.

The tube 51 has an external diameter substantially equal to the internal diameter of the annular portion 15 of the base 12, preferably of 110 mm.

The tube 51 is arranged between the base 12 and the element 22.

One of the advantages of the disclosure resides in the use of an extender tube preferably made of plastic material, such as for example PVC or polyethylene, which is easily commercially available. The tube 51 can be already manufactured in different standard measurements or can be cut, according to the requirements, from tubes with a starting length of up to 10000 mm.

The side wall of the tube 51 has, for example, a minimum thickness of 3.5 mm.

A ring 52 is used in order to be able to associate the extender tube 51 with the element 22.

The ring 52 is preferably made of plastic material, or other material suitable for thermoforming and/or suitable to provide connections for supports for raised floor coverings, and comprises a substantially annular body with a first portion 53 that has an internal thread 55 in the internal surface, and a second portion 54 that has a knurled internal surface 56.

The two portions of the ring 52 are separated by a disk-like reinforced supporting body 57 adapted to rest on the circumference of one of the ends of the tube 51.

In particular, the internal edge of the disk-like body 57 has a diameter that is smaller than the inside diameter of the lateral edge of the tube 51, so as to ensure resting that is distributed on the entire surface of the body 57.

The perimetric edge of the ring 52 has an internal diameter substantially equal to the external diameter of the tube 51 of the element 22.

The first portion 53 is adapted to the insertion of the element 22 and the internal thread 55 is threaded complementarily to the external thread 27 of the element 22 in order to ensure an association between the element 22 and the ring 52.

The knurled surface 56 of the second portion 53 is adapted to generate friction in order to hinder the rotation of the extender tube 51.

In constructive variations, not shown in the figures, said surface can be also smooth or provided with a satin finish adapted to increase friction.

The ring 52 has a region 58 that can be perforated easily, constituted by a recess and/or a thinning of the structure, on the perimetric edge of the second portion 54.

Such region 58 is adapted to be perforated for the insertion of an element, not shown in the figures, for fixing the ring 52 to the tube 51, such as for example a screw.

Multiple wings 59 extend from the external surface of the perimetric edge of the ring 52 and are adapted to facilitate the grip and handling of said ring.

Specifically, the wings 59 have an extension along axes which are parallel to the axis of extension of the support 10.

The support 10 can have a layer 60 made of sound-absorbing material, such as for example rubber or other material suitable to obtain noise attenuation.

The layer 60 is adapted to muffle and reduce the sound generated by steps on the raised floor and to reduce the sliding of the floor covering on the head of the support.

The layer 60 is arranged on top of the head 23 and below the tiles 11.

The layer 60 has a substantially disk-like shape, but can have other regular and irregular geometric shapes as well.

In particular, the internal perimetric edge 63 has a diameter that is greater than the space occupation of the body 33 of the element 22.

The layer 60 has a plurality of through holes 61 arranged at the removable tabs 49 of the head 23. Said holes 61 are adapted for the insertion and passage of said tabs 49.

The internal perimetric edge 63 is in relief and is adapted to correspond to the internal disk-like edge 43 of the head 23, creating an interference.

Furthermore, the layer 60 has a plurality of protrusions 62 with such a shape and dimensions as to be inserted in, and generate interference with, the corresponding holes 47 and/or openings 41 for anchoring the head 23.

Figures 8A, 8B:
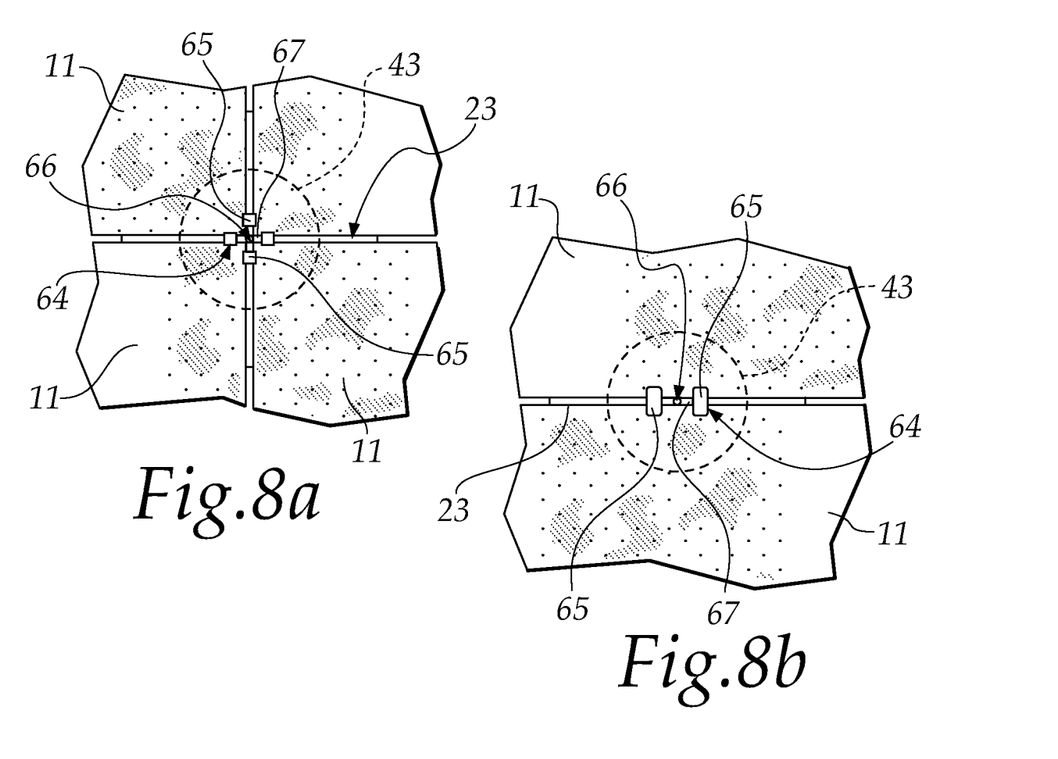
FIGS. 8a and 8b are each a top view of a configuration for application of the support of FIG. 1 with a wind-resistant fixing element.

With reference to FIGS. 8a and 8b, the support 10 can comprise means 64 for anchoring the tiles 11 to the head 23 so as to obtain a wind-resistant retention.

In particular, said means 64 are anchored to the element 22. Said means 64 are engaged in a perforated bush provided for this purpose, made of hard plastic or other suitable material, not shown in the figures.

The bush is in turn inserted, with an interlocking coupling, in the hole 24.

In this manner, a reinforced grip for the means 64 is obtained.

Said means 64 have a supporting element 67 with an extension that is parallel to the extension of the support 10 and one or more plate-like elements 65 extending on a plane that is perpendicular to the axis of extension of the supporting element 67 and parallel to the surface of the raised floor.

The supporting element 67 is inserted with an interlocking coupling in the above described bush.

The means 64 have such a shape and dimensions as to generate an interference with one or more tiles 11, fixing them to the resting head 23.

FIG. 8a shows fixing means 64 for the support 10 at the intersection of four tiles 11. FIG. 8b instead shows means 64 for linear fixing between two tiles 11.

The means 64 can have a central hole 66 for inserting a through screw and/or a quick-opening clip for fixing to the bush.

FIGS. 9a to 9d show in cross-section four different operating configurations of the support 10.

Figure 9A:
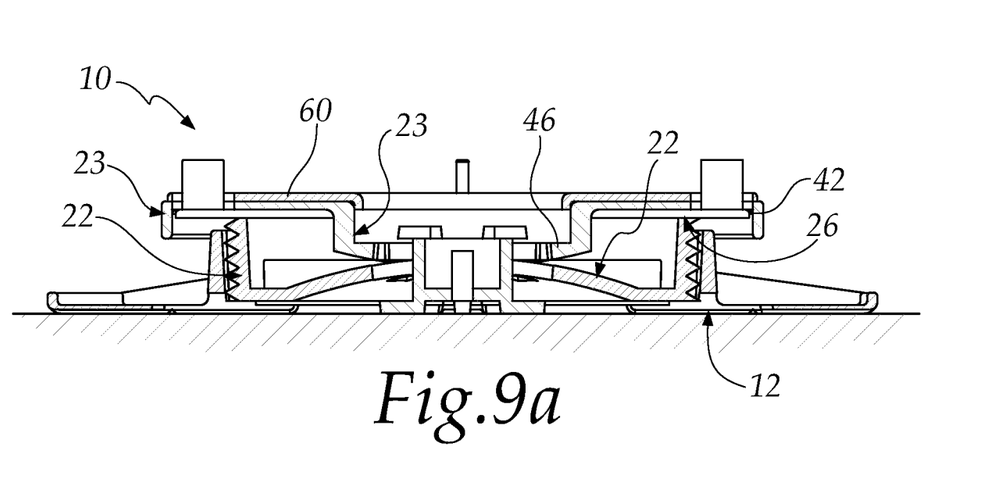
FIGS. 9a to 9d are sectional side views of four configurations of application of the support of FIG. 1.

In particular, FIG. 9a shows a cross-section of the support 10 for providing a raised floor that is parallel to the lower surface, without the use of an extender tube 51.

Figure 9B:
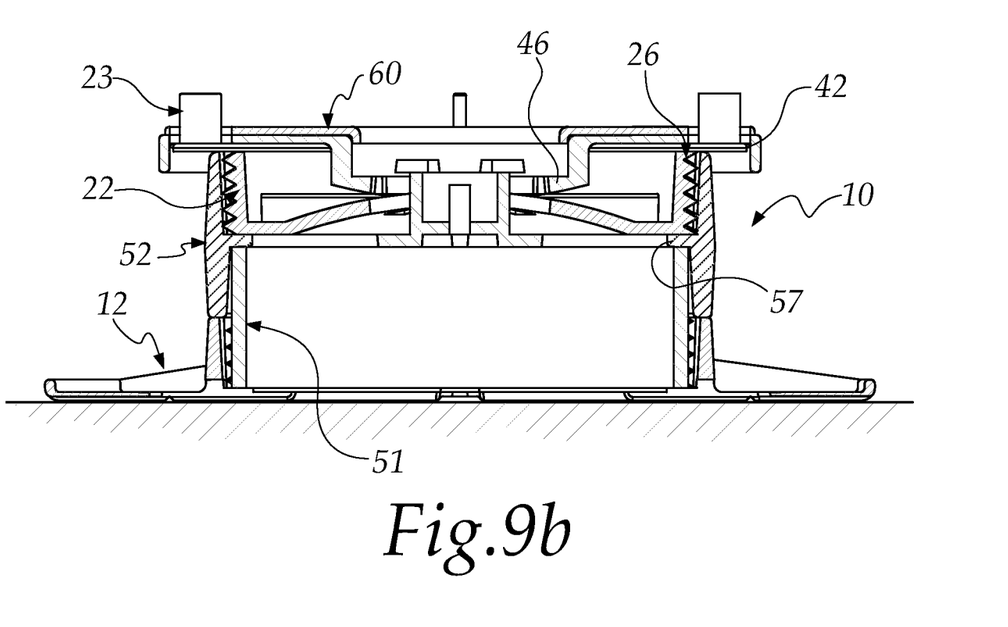

FIG. 9b shows a cross-section of the support 10 for providing a raised floor that is parallel to the lower surface, with the use of an extender tube 51.

Figure 9C:
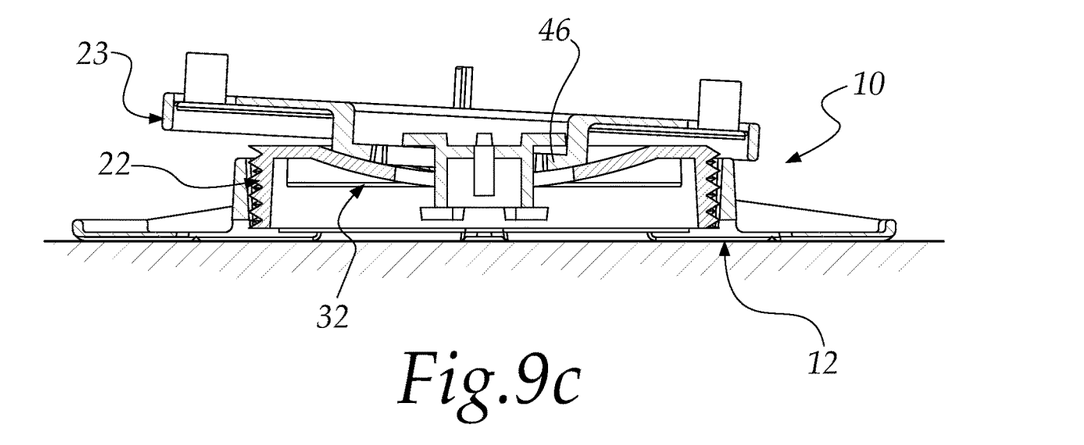

FIG. 9c shows a cross-section of the support 10 for providing a raised floor with an inclination with respect to the lower surface, without the use of an extender tube 51.

Figure 9D:
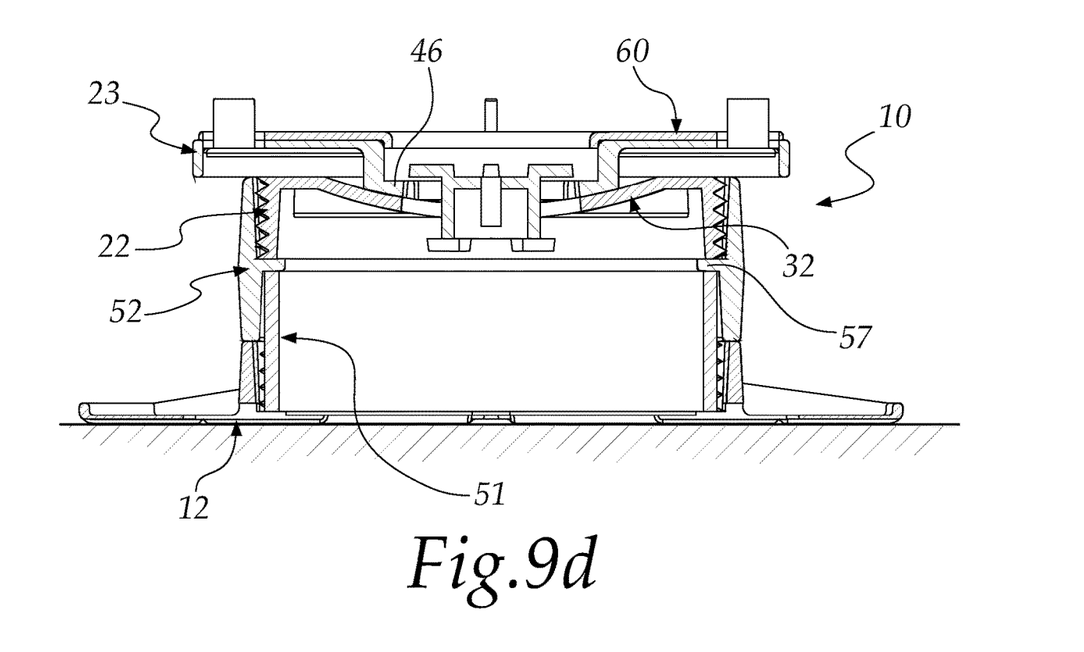

FIG. 9d shows a cross-section of the support 10 for providing a raised floor with an inclination with respect to the lower surface, with the use of an extender tube 51.

In practice it has been found that the disclosure achieves the intended aims and advantages, providing a support for raised floors that allows to provide both floors parallel to the lower surface and floors with an inclination with respect to said surface simply by turning the adjustment element upside down.

It should be noted that, with the disclosure, a support has been devised which allows to reduce storage volumes for its stocking.

The disclosure thus conceived is susceptible of numerous modifications and variations, all of which are within the appended claims; all the details may furthermore be replaced with other technically equivalent elements.

In practice, the materials used, so long as they are compatible with the specific use, as well as the contingent shapes and dimensions, may be any according to the requirements and the state of the art.

What is claimed is:

1. A support for raised floors, comprising in the following order: a base for resting on a lower surface, a connecting and adjustment element for connecting and adjusting the local height of a raised floor, and a resting head for one or more tiles of said raised floor, wherein said connecting and adjustment element has a first portion, for providing floors that are inclined with respect to said lower surface, and a second portion, which lies opposite said first portion, for providing floors that are parallel to said lower surface, said first portion and said second portion interacting alternately with said head by rotating said element through 180°, wherein when said first portion is directed toward said resting head and said second portion is arranged toward said base, said resting head is configured to slide or rotate on a concavity of the connecting and adjustment element for adjusting the inclination of the plane of said floor such that said floors are inclined relative to said lower surface, and wherein when said first portion is arranged toward said base and said second portion is directed toward said resting head, said resting head rests stably without the possibility for inclination such that said floors are parallel to the lower surface.

2. The support according to claim 1, wherein said first portion of said adjustment element has a region with a dome shape, with the concavity directed upward and a point of maximum concavity at a central through hole, in an active configuration.

3. The support according to claim 2, wherein said dome region is comprised between a disk surface, which is perpendicular to a perimetric edge of said adjustment element, and said central through hole.

4. A support for raised floors, comprising in the following order: a base for resting on a lower surface, a connecting and adjustment element for connecting and adjusting the local height of a raised floor, and a resting head for one or more tiles of said raised floor, wherein said connecting and adjustment element has a first portion, for providing floors that are inclined with respect to said lower surface, and a second portion, which lies opposite said first portion, for providing floors that are parallel to said lower surface, said first portion and said second portion interacting alternately with said head by rotating said element through 180°, wherein said first portion of said adjustment element has a region with a dome shape, with the concavity directed upward and a point of maximum concavity at a central through hole, in an active configuration, wherein said dome region is comprised between a disk surface, which is perpendicular to a perimetric edge of said adjustment element, and said central through hole, wherein proximate to said central through hole said adjustment element comprises a central body provided with a plurality of wings.

5. A support for raised floors, comprising in the following order: a base for resting on a lower surface, a connecting and adjustment element for connecting and adjusting the local height of a raised floor, and a resting head for one or more tiles of said raised floor, wherein said connecting and adjustment element has a first portion, for providing floors that are inclined with respect to said lower surface, and a second portion, which lies opposite said first portion, for providing floors that are parallel to said lower surface, said first portion and said second portion interacting alternately with said head by rotating said element through 180°, wherein said first portion of said adjustment element has a region with a dome shape, with the concavity directed upward and a point of maximum concavity at a central through hole, in an active configuration, wherein said dome region is comprised between a disk surface, which is perpendicular to a perimetric edge of said adjustment element, and said central through hole, wherein said disk surface has a plurality of holes provided with a raised edge.

6. The support according to claim 4, wherein said second portion of said adjustment element has a plurality of ribs, each extending between said perimetric edge and said central body, integrating in said dome region and substantially vanishing proximate to said central body.

7. The support according to claim 4, wherein around said central body there is a plurality of through holes.

8. The support according to claim 6, wherein said perimetric edge has an external thread which is threaded complementarily to an internal thread provided on an internal lateral surface of an annular portion of said base.

9. The support according to claim 8, wherein said external thread has, at first and second ends, a portion provided with a contour that is adapted to generate a snap action or a hindrance to a rotation of said adjustment element.

10. The support according to claim 1, wherein said resting head has a substantially disk shape, with a central through hole, with an axis of extension that is parallel to an axis of extension of said support.

11. The support according to claim 10, wherein a profile of said central through hole of said head is substantially circular and has localized widenings of the diameter for the passage of a central body of said adjustment element with a plurality of wings.

12. The support according to claim 10, wherein said resting head comprises a substantially tray body, which protrudes from a lower surface of said resting head, said tray body incorporating said central through hole, said central through hole being located in a base of a tray that constitutes said tray body.

13. The support according to claim 12, wherein said base of said tray body has a concavity directed upward.

14. The support according to claim 12, wherein a lateral edge of said tray that constitutes the tray body has a circular contour that forms an internal edge for said resting head.

15. The support according to claim 14, wherein said resting head has a plurality of through openings or a plurality of holes.

16. The support according to claim 14, wherein said resting head has a plurality of reinforcement ribs which are extended between an outer perimetric edge and said internal edge.

17. The support according to claim 1, wherein said resting head has a plurality of removable tabs.

18. The support according to claim 1, further comprising an extender tube between said base and said adjustment element.

19. The support according to claim 8, wherein said base has a wider portion, which is perpendicular to said annular portion and comprises a plurality of regions, within a space occupation defined by said annular portion, said regions having, proximate to an inner perimetric edge of said annular portion, a knurled surface.

20. The support according to claim 19, wherein said wider portion has a central through hole inside said annular portion.

21. The support according to claim 19, wherein said wider portion has a plurality of through openings or a plurality of holes.

22. The support according to claim 18, further comprising a ring.

23. The support according to claim 22, wherein said ring comprises a substantially annular body with a first portion provided with an internal thread on an internal surface, which is threaded complementarily with respect to an external thread of said adjustment element, and a second portion provided with a knurled internal surface.

24. The support according to claim 23, wherein said first and second portions of said ring are separated by a disk body that has a diameter that is smaller than an inside diameter of a lateral edge of said extender tube.

25. The support according to claim 22, wherein a perimetric edge of said ring has an inside diameter that is substantially comparable with an outside diameter of said extender tube and of said adjustment element.

26. The support according to claim 22, wherein said ring has a region that is perforated easily.

27. The support according to claim 22, wherein said ring has a plurality of wings that extend on an outer lateral surface.

28. The support according to claim 15, further comprising a layer of sound-absorbing material, above said resting head and below said tiles.

29. The support according to claim 28, wherein said layer has a substantially disk shape, with an internal perimetric edge that has a larger diameter than a space occupation of a central body of said adjustment element.

30. The support according to claim 29, wherein said internal perimetric edge is in relief and is adapted to correspond to an internal edge of said resting head.

31. The support according to claim 28, wherein said layer has a plurality of through holes arranged at removable tabs of said resting head.

32. The support according to claim 28, wherein said layer has a plurality of protrusions with a shape and dimensions such as to be inserted in, and generate interference with, the corresponding holes or the openings of said head.

33. The support according to claim 1, further comprising means for anchoring said tiles to said resting head for a wind-resistant retention.

34. The support according to claim 1, further comprising an auxiliary element on said resting head to provide a raised floor made of wood with floating slats.

* * * * *